United States Patent
Helmsing et al.

(10) Patent No.: US 10,358,076 B2
(45) Date of Patent: Jul. 23, 2019

(54) SEMITRAILER CONFIGURED AS A MOBILE PRESENTATION ENCLOSURE WITH IMPROVED ACCESS FOR INDIVIDUALS

(71) Applicant: Craftsmen Industries, Inc., St. Charles, MO (US)

(72) Inventors: Michael Joseph Helmsing, Frontenac, MO (US); Brian Orf, St. Charles, MO (US); John E. Szyhowski, Troy, MO (US); Todd Rio, Union, MO (US); Eric Held, Overland, MO (US); Mark D. Steele, Springfield, MO (US)

(73) Assignee: Craftsmen Industries, Inc., St. Charles, MO (US)

( * ) Notice: Subject to any disclaimer, the term of this patent is extended or adjusted under 35 U.S.C. 154(b) by 50 days.

(21) Appl. No.: 15/798,954

(22) Filed: Oct. 31, 2017

(65) Prior Publication Data

US 2019/0126806 A1    May 2, 2019

(51) Int. Cl.
| | |
|---|---|
| *B60P 3/00* | (2006.01) |
| *B60P 3/025* | (2006.01) |
| *B62D 53/06* | (2006.01) |
| *B62D 53/08* | (2006.01) |

(52) U.S. Cl.
CPC ............ *B60P 3/025* (2013.01); *B62D 53/067* (2013.01); *B62D 53/0842* (2013.01); *B60P 3/0255* (2013.01); *B60P 3/0257* (2013.01)

(58) Field of Classification Search
CPC ....... B60P 3/025; B60P 3/0255; B60P 3/0257; B62D 53/067; B62D 53/0842
See application file for complete search history.

(56) References Cited

U.S. PATENT DOCUMENTS

| | | | |
|---|---|---|---|
| 2,168,069 A | 8/1939 | Miller | |
| 4,535,933 A | 8/1985 | Kuiper | |
| 5,285,604 A | 2/1994 | Carlin | |
| 5,538,225 A * | 7/1996 | VanDenberg | ............ B60S 9/08 |
| | | | 254/419 |
| 6,302,475 B1 | 10/2001 | Anderson | |
| 6,997,495 B1 | 2/2006 | Groezinger | |
| 8,141,304 B2 | 3/2012 | Shen et al. | |
| 8,869,463 B2 | 10/2014 | Noiseux et al. | |
| 2004/0108750 A1 | 6/2004 | Park | |
| 2006/0071447 A1 * | 4/2006 | Gehring | ................... B60D 1/36 |
| | | | 280/477 |
| 2009/0184490 A1 * | 7/2009 | Alguera | ................... B60D 1/62 |
| | | | 280/420 |
| 2014/0151979 A1 * | 6/2014 | Puckett | ................... B60D 1/36 |
| | | | 280/477 |
| 2015/0151799 A1 * | 6/2015 | Cantin | ...................... A61L 2/00 |
| | | | 296/24.38 |

(Continued)

OTHER PUBLICATIONS

Frac-N-Vac Tanks, LLC, "What are Frac Tanks", www.fracnvac.com, © 2009, Nov. 10, 2017.

*Primary Examiner* — Lori L Lyjak
(74) *Attorney, Agent, or Firm* — Joseph M. Rolnicki; Evans & Dixon, L.L.C.

(57) ABSTRACT

A semitrailer is configured as a mobile presentation enclosure where the semitrailer rests on the ground when detached from a truck which enables individuals to easily access a floor top surface in an interior of the semitrailer by taking one step up onto the floor top surface in the interior of the semitrailer.

20 Claims, 12 Drawing Sheets

(56) References Cited

U.S. PATENT DOCUMENTS

2016/0114844 A1\* 4/2016 Harris ................. B62D 63/061
                                                    280/433
2017/0174271 A1\* 6/2017 Baker ................. B62D 35/001
2017/0232880 A1    8/2017 Peterson et al.
2018/0186272 A1\* 7/2018 Borden ................ G09F 21/048

\* cited by examiner

SEMITRAILER CONFIGURED AS A MOBILE PRESENTATION ENCLOSURE WITH IMPROVED ACCESS FOR INDIVIDUALS

FIELD

This disclosure is directed to a semitrailer that is configured as a mobile presentation enclosure. The semitrailer can be opened up to provide access to a top surface of a floor inside the semitrailer. The top surface of the floor is positioned below an axis of rotation of the semitrailer wheels. When the semitrailer is detached from a truck towing the semitrailer, the semitrailer can be dropped down to where a bottom surface of the semitrailer rests on the ground. This positions the floor inside the semitrailer in close proximity to the ground, enabling individuals to easily access an interior of the semitrailer by taking one step up onto the top surface of the floor.

BACKGROUND

Semitrailers as well as other types of trailers that can be towed by a separate vehicle have been configured as mobile presentation enclosures where the trailer can be towed or transported to a location, detached from the towing vehicle and then opened to provide access to an interior of the semitrailer. Semitrailers of this type have one or more side panels on the opposite side walls of the semitrailer that can be moved between open and closed positions. In the closed position the side panel covers over an access opening in a side wall of the semitrailer. In the opened position the side panel is moved away from the opening, providing access to the interior of the semitrailer through the opening. Examples of semitrailers of this type are disclosed in the U.S. patent of Kuiper, U.S. Pat. No. 4,535,933 and the U.S. patent of Groezinger, U.S. Pat. No. 6,997,495, both of which are incorporated by reference.

The interior of a semitrailer of the above described type has a floor top surface that can be accessed by individuals that enter the interior of the semitrailer. However, because the semitrailer is supported on wheel assemblies positioned beneath the semitrailer floor, the floor surface in the interior of the semitrailer is elevated by the wheel assemblies. In order for an individual to access the interior of the semitrailer, they must walk up stairs or up steep ramps that provide access to the floor in the interior of the semitrailer. In some situations, the stairs or steep ramps can interfere with or prevent access to the floor in the interior of the semitrailer for individuals having disabilities.

SUMMARY

The semitrailer of this disclosure is constructed in a manner that improves individual access to a floor surface in the interior of the semitrailer. The semitrailer is constructed in a manner where, when the semitrailer is disconnected from a truck or other type of towing vehicle, the semitrailer can be lowered down to where a bottom surface of the semitrailer rests on the ground. This positions the floor in the interior of the semitrailer substantially parallel to and slightly above the ground, where the floor surface can be easily accessed by simply taking one step up onto the floor surface.

The semitrailer is configured as a mobile presentation enclosure. The floor in the interior of the semitrailer is designed to accommodate a variety of different features, depending on what type of presentation is desired in the semitrailer. For example, the floor could be outfitted with features of a food vending stand such as a kitchen and an ordering counter where individuals accessing the interior of the semitrailer can place food orders with individuals working in the interior of the semitrailer.

The floor in the interior of the semitrailer could be outfitted with features of an automobile display with an automobile supported on the floor. Individuals can access the floor in the interior of the semitrailer to observe the automobile.

The floor in the interior of the semitrailer could also be outfitted with features of a lounge such as a bar, tables and chairs. Individuals accessing the interior of the semitrailer can place orders for beverages at the bar and then relax at the tables and chairs.

The above are only a few examples of how the semitrailer can be configured as a mobile presentation enclosure.

As stated earlier, a primary feature of the semitrailer is the floor in the interior of the semitrailer which has a top surface that can be easily accessed from a person stepping up onto the floor from a surface supporting the semitrailer.

The construction of the semitrailer includes a kingpin assembly at the forward edge of the floor. The kingpin assembly includes a kingpin that is releasably attachable to a truck that is separate from the semitrailer. The construction of the kingpin assembly positions the entire top surface of the floor inside the semitrailer vertically below the kingpin.

The construction of the semitrailer also includes a wheel assembly at the rearward edge of the floor. The wheel assembly includes wheels of the semitrailer that support the semitrailer on a surface both when the semitrailer is attached to a truck and is being towed, and when the semitrailer has been moved to its desired location and is detached from the truck. The wheels of the wheel assembly have a common axis of rotation. The construction of the wheel assembly positions the entire top surface of the floor inside the semitrailer vertically below the axis of rotation.

The kingpin assembly of the semitrailer and the wheel assembly of the semitrailer are constructed whereby, when the wheels of the wheel assembly are on a surface and the kingpin of the kingpin assembly is releasably attached to a truck on the surface, the wheels and the truck support the semitrailer spaced vertically above the surface with the floor inside the semitrailer oriented at an angle relative the surface. When the wheels of the wheel assembly are on the surface and the kingpin of the kingpin assembly is not attached to the truck, the semitrailer is lowered down. As the semitrailer is lowered down it moves through an arc around the axis of rotation of the wheels until the bottom of the semitrailer rests on the surface and the floor is substantially parallel to the surface and in close proximity to the surface.

The semitrailer is also constructed with a first side wall that extends a longitudinal length of the semitrailer between a rearward end of the semitrailer and a forward end of the semitrailer, and a second side wall that extends the longitudinal length of the semitrailer between the rearward end of the semitrailer and the forward end of the semitrailer. The second side wall is spaced laterally from the first side wall.

A rearward wall extends laterally across the rearward end of the semitrailer between the first side wall and the second side wall, and a forward wall extends laterally across the forward end of the semitrailer between the first side wall and the second side wall.

A roof extends over the semitrailer between the first side wall and the second side wall, and the rearward wall and the forward wall. The roof, the floor, the first side wall, the second side wall, the rearward wall and the forward wall form an enclosure around the top surface of the floor of the semitrailer.

An opening is provided through the first side wall of the semitrailer. The opening is generally rectangular and extends between the top surface of the floor and the roof, and between the wheel assembly at one end of the opening and the kingpin assembly at the opposite end of the opening. There are no obstructions in the opening between the wheel assembly and the kingpin assembly. With the semitrailer dropped down or lowered down onto a surface, the opening enables an individual to access the interior of the semitrailer by stepping up from the surface supporting the semitrailer onto the top surface of the floor in the interior of the semitrailer.

A first side panel is provided on the first side wall of the semitrailer. The first side panel is mounted to the first side wall for movement between a closed position of the first side panel relative to the first side wall where the first side panel extends over and closes the opening in the first side wall, and an opened position of the first side panel relative to the first side wall where the first side panel projects outwardly from the first side wall and exposes the opening in the first side wall of the semitrailer. The first side panel is connected along an edge of the roof, for example by a pivoting connection, that enables the first side panel to be moved to its opened position along the edge of the roof. In this position of the first side panel, the first side panel forms a canopy that is an extension of the roof. A second side panel could also be provided on the first side wall of the semitrailer. The second side panel is also mounted to the first side wall for movement between a closed position of the second side panel relative to the first side wall where the second side panel extends over the opening in the first side wall, and an opened position of the second side panel relative to the first side wall where the second side panel projects outwardly from the first side wall. The second side panel is connected along an edge of the floor, for example by a pivoting connection, that enables the second side panel to be moved to its opened position along the edge of the floor and rest on the surface supporting the lowered semitrailer. In this position of the second side panel, the second side panel forms a patio that is an extension of the floor top surface. Additionally, in this position of the second side panel, the second side panel is substantially at the same vertical height as the top surface of the floor in the interior of the semitrailer. This enables individuals to easily access the second side panel by stepping up onto the second side panel from the surface supporting the second side panel.

The semitrailer could also be constructed with a second opening in the second side wall, and a second canopy side panel on the second side wall and a second stage or patio side panel on the second side wall.

The construction of the semitrailer described above eliminates the need for stairs or steep ramps and hand rails, and thereby improves individual access to the floor surface in the interior of the semitrailer.

BRIEF DESCRIPTION OF THE DRAWINGS

Further features of the semitrailer of this disclosure are set forth in the following detailed description of the semitrailer and in the drawing figures.

DETAILED DESCRIPTION

Figure 1:
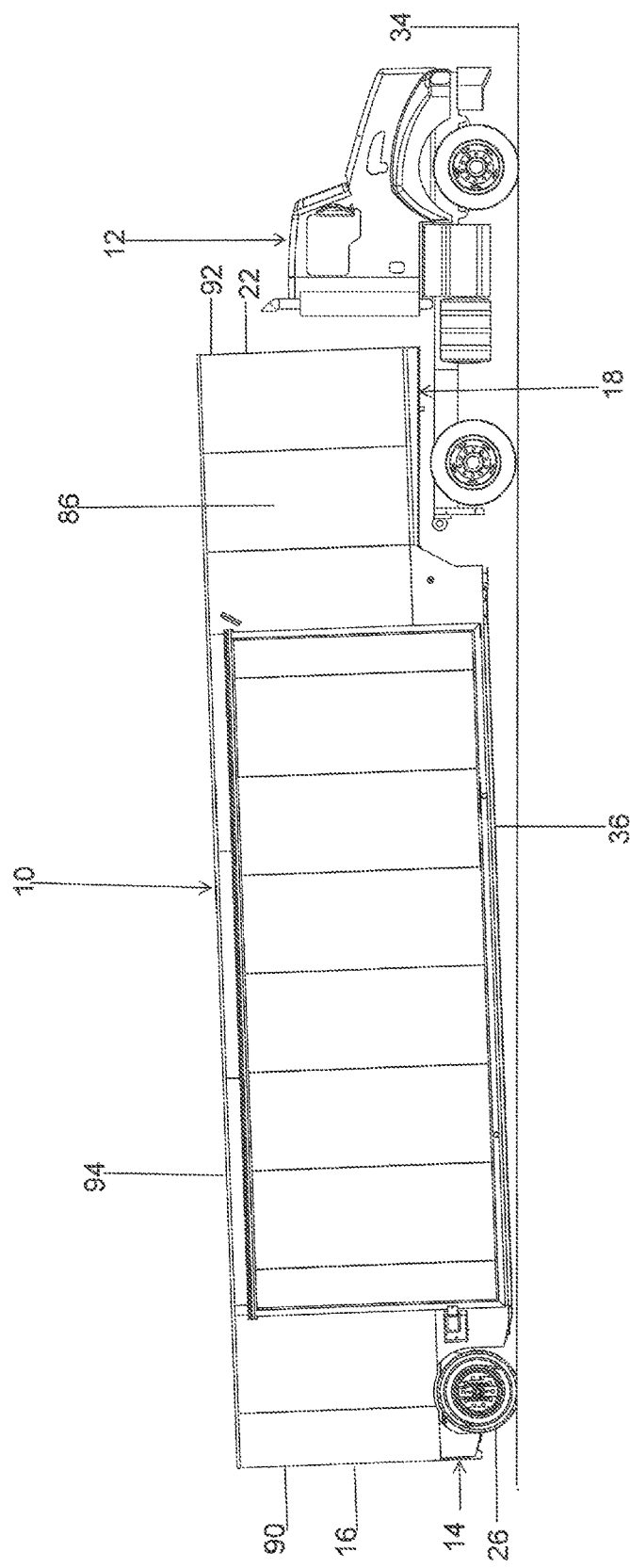
FIG. 1 is a representation of a side elevation view of the semitrailer releasably attached to a truck for towing the semitrailer.
Figure 2:
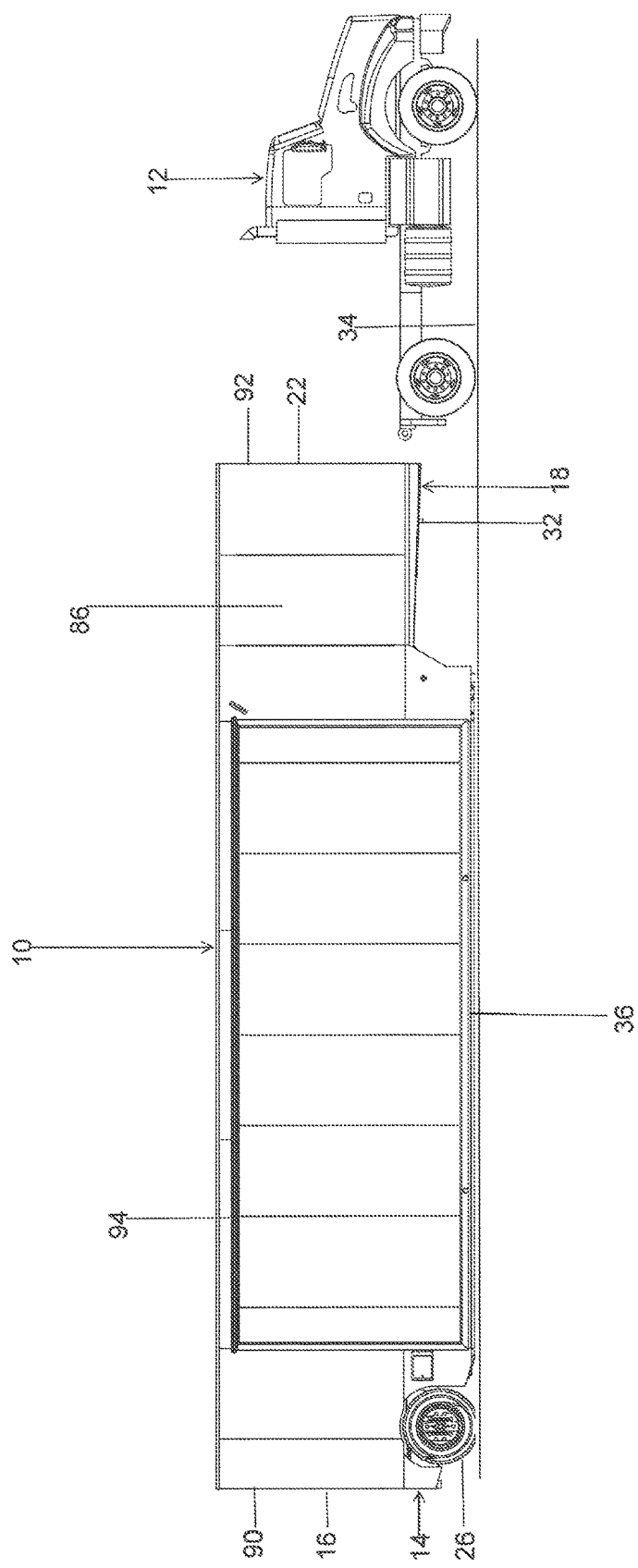
FIG. 2 is a representation of a side elevation view of the semitrailer where the semitrailer has been detached from the truck and lowered to the ground where a bottom surface of the semitrailer rests on a surface of the ground.

FIGS. 1 and 2 are representations of the semitrailer 10 of this disclosure and a truck 12 that is capable of towing the semitrailer 10. Although a semitrailer is shown and described herein, the concepts of this disclosure are equally well suited to applications on fifth wheel trailers, goose neck trailers and other equivalent types of trailers. The semitrailer 10 is basically comprised of a wheel assembly 14 at a rearward end 16 of the semitrailer, a kingpin assembly 18 at a forward end 22 of the semitrailer and a floor assembly (not visible in FIGS. 1 and 2) that extends longitudinally between the wheel assembly 14 and the kingpin assembly 18.

The wheel assembly 14 includes a plurality of wheels 26 that all have a common axis of rotation 28. As will be explained, the axis of rotation 28 is positioned vertically above the entire top surface of the floor supported by the floor assembly. Stated differently, the entire top surface of the floor is positioned vertically below the axis of rotation 28.

The kingpin assembly 18 includes a kingpin 32 secured to the kingpin assembly. The kingpin 32 is spaced vertically above the entire top surface of the floor supported by the floor assembly. Stated differently, the entire top surface of the floor is positioned vertically below the kingpin 32.

As represented in FIG. 1, when the wheels 26 of the wheel assembly 14 are on a surface 34 and the kingpin 32 of the kingpin assembly 18 is releasably attached to a truck 12 on the surface 34, the wheels 26 and the truck 12 support the semitrailer 10 with a bottom surface 36 of the semitrailer spaced vertically above the surface 34. In this position of the semitrailer 10, the floor in the interior of the semitrailer 10 is oriented at an angle relative to the surface 34.

As represented in FIG. 2, when the wheels 26 of the wheel assembly 14 are on the surface 34 and the kingpin 32 of the kingpin assembly is not attached to the truck 12, the semitrailer 10 drops down or is lowered down. As the semitrailer 10 is lowered down it moves through an arc around the axis of rotation 28 of the wheels 26 until the bottom surface 36 of the semitrailer 10 engages or rests on the surface 34. In this position the floor in the interior of the semitrailer 10 is substantially parallel to the surface 34 and in close proximity to the surface 34. In the dropped down position of the semitrailer 10, the top surface of the floor is 11 inches or less above the surface 34, and preferably is about 8 inches above the surface.

Figure 3:
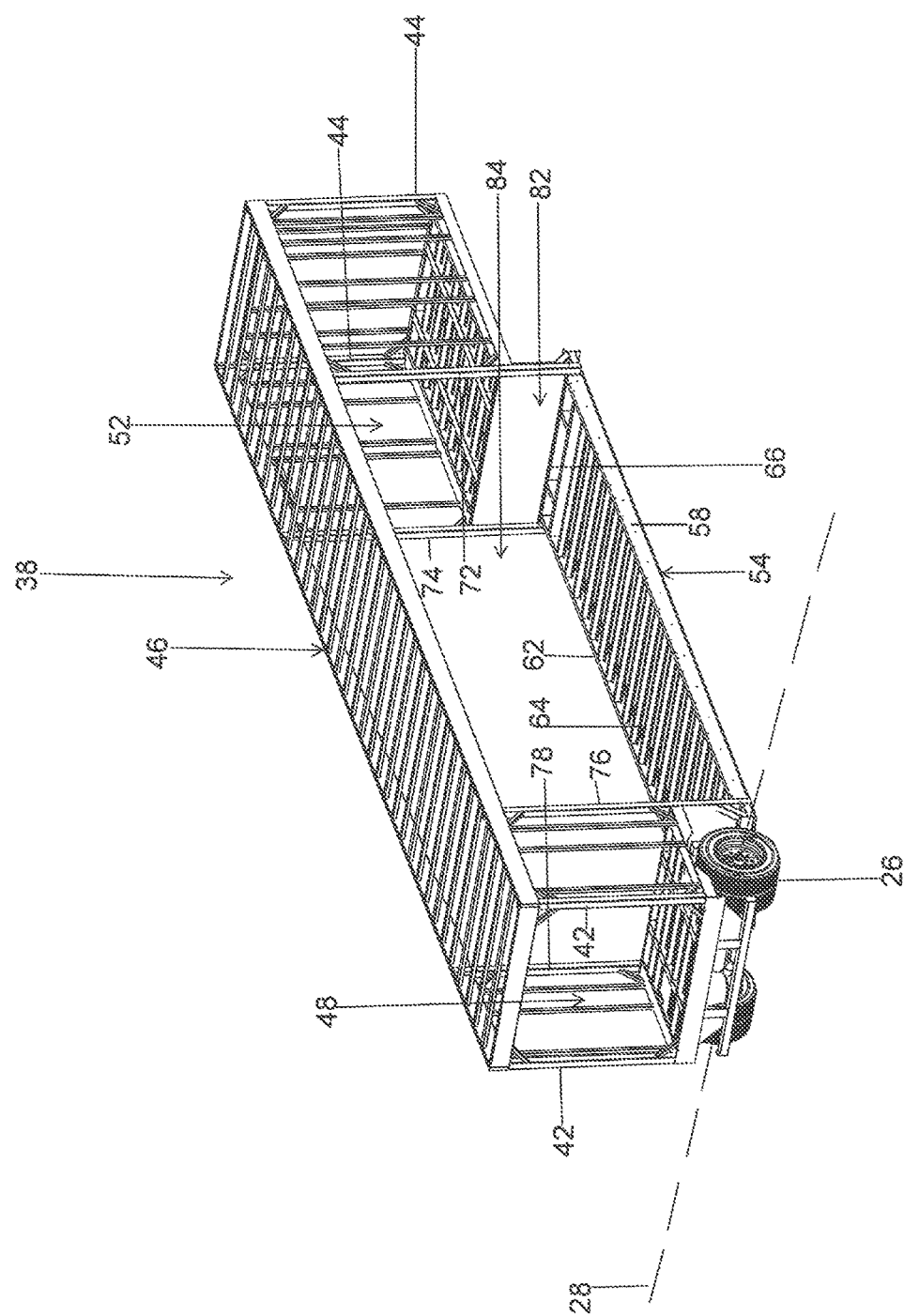
FIG. 3 is a representation of a perspective view of the frame of the semitrailer from the rear of the frame.
Figure 4:
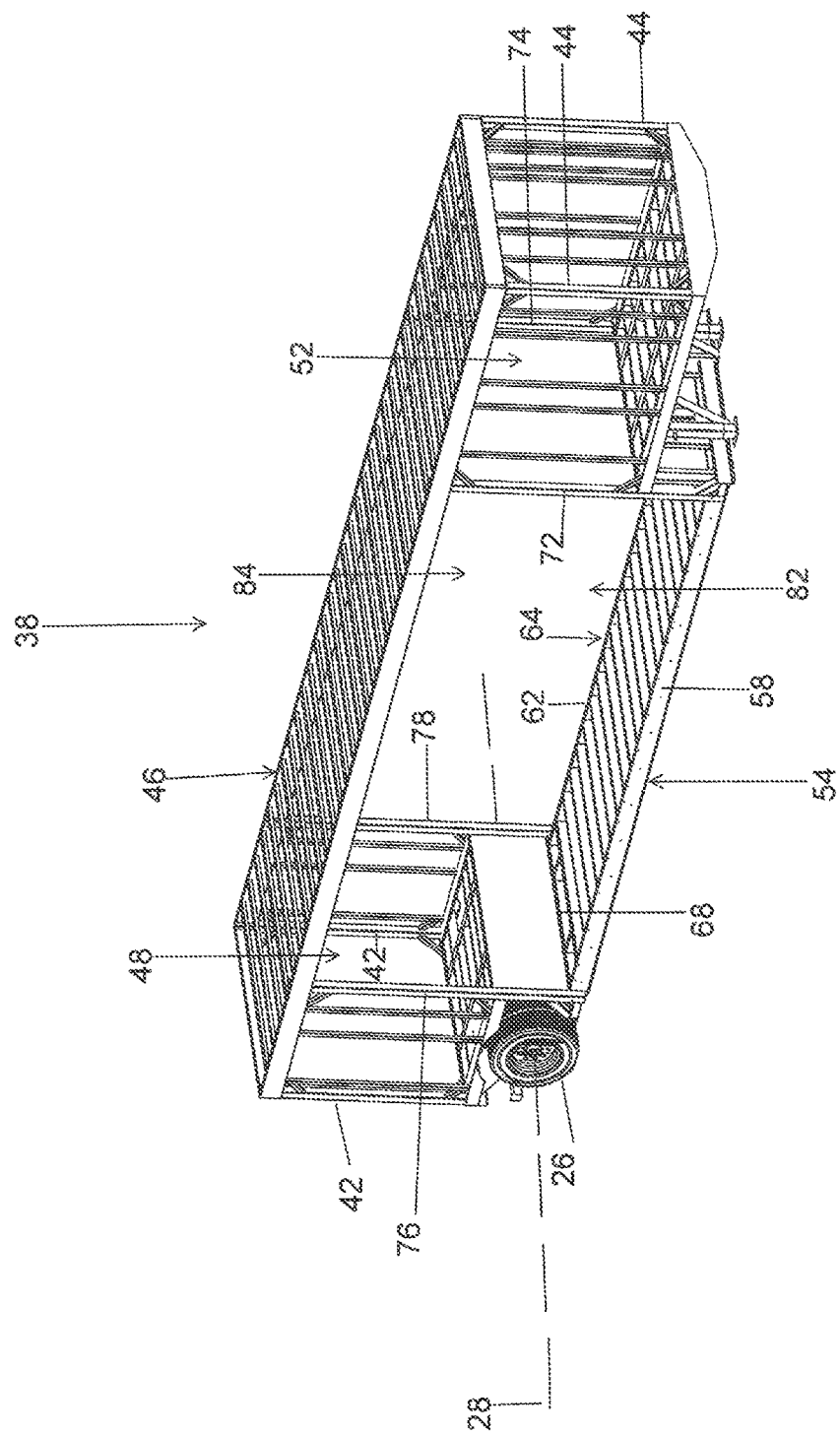
FIG. 4 is a representation of a perspective view of the frame from the front of the frame.
Figure 5:
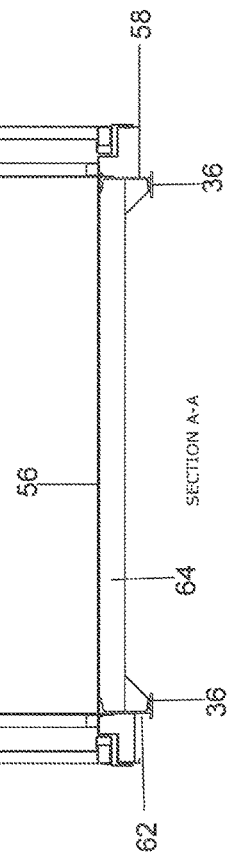
FIG. 5 is a representation of a side elevation view of the semitrailer.

FIGS. 3 and 4 are representations of a frame of the semitrailer 10. The frame 38 has a longitudinal length and a lateral width. The frame 38 includes the wheel assembly 14 at the rearward end of the frame. As represented in FIGS. 3 and 4, the wheel assembly 14 is comprised of a plurality of longitudinally oriented beams and structures and laterally oriented beams and structures that are assembled together in any conventional manner to provide the wheel assembly 14 with sufficient strength to support the semitrailer 10 on the wheels 26 of the wheel assembly 14. The frame 38 also includes the kingpin assembly 18 at the forward end of the frame. As represented in FIGS. 3 and 4, the kingpin assembly 18 is comprised of a plurality of longitudinally oriented beams and structures and laterally oriented beams and structures that are assembled together in any conventional manner to provide the kingpin assembly 18 with sufficient strength to support the semitrailer 10 on a truck.

The frame 38 also includes a plurality of vertical beams 42 that extend upwardly from the wheel assembly 14. The vertical beams 42 can be constructed to the wheel assembly 14 in any conventional manner.

The frame 38 also includes a plurality of vertical beams 44 that extend upwardly from the kingpin assembly 18. The vertical beams 44 can be assembled to the kingpin assembly 18 in any conventional manner.

The vertical beams 42 of the wheel assembly 14 and the vertical beams 44 of the kingpin assembly 18 extend upward to and are assembled to a roof frame 46. The roof frame 46 supports the roof of the semitrailer 10, as will be explained. The vertical beams 42 extending upwardly from the wheel assembly 14 to the roof frame 46 define an enclosed area 48 above the wheel assembly 14. The vertical beams 44 extending upwardly from the kingpin assembly 18 to the roof frame 46 define an enclosed area 52 above the kingpin assembly 18.

The frame 38 of the semitrailer 10 also includes a floor frame 54. The floor frame 54 supports the floor of the semitrailer 10. The top surface 56 of the floor is visible in the representations of FIGS. 6-13. The floor frame 54 includes a first side beam 58 and a second side beam 62 that extend along the longitudinal length of the floor on laterally opposite sides of the floor. The first side beam 58 defines a first longitudinal edge of the floor and the second side beam 62 defines a second longitudinal edge of the floor.

Figure 6:
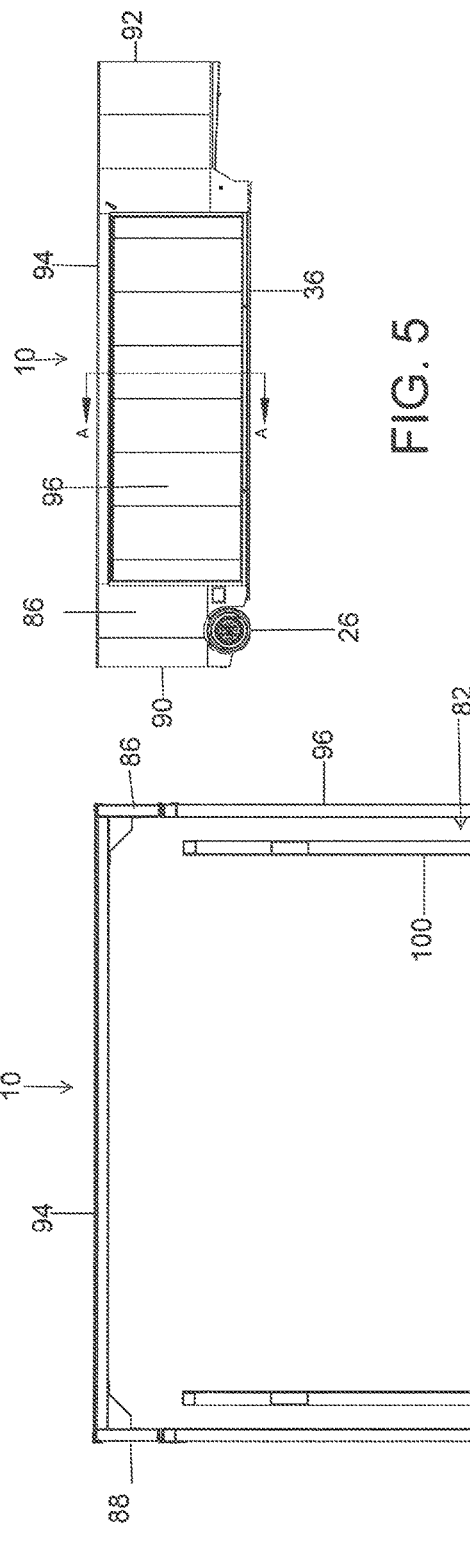
FIG. 6 is a representation of a cross-section elevation view in a plane of the line A-A of FIG. 5.
Figure 7:
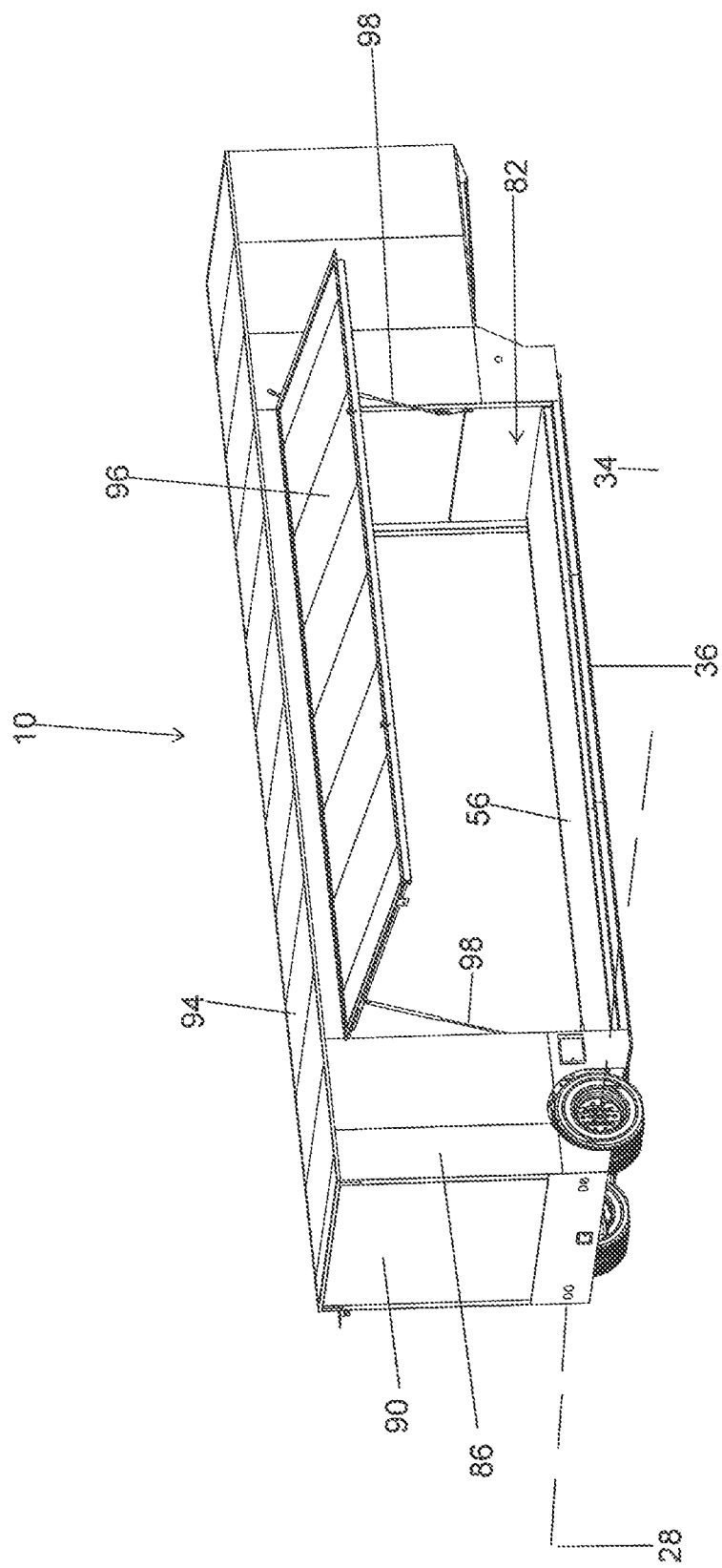
FIG. 7 is a representation of a perspective view of a first embodiment of the semitrailer from the rear of the semitrailer.
Figure 8:
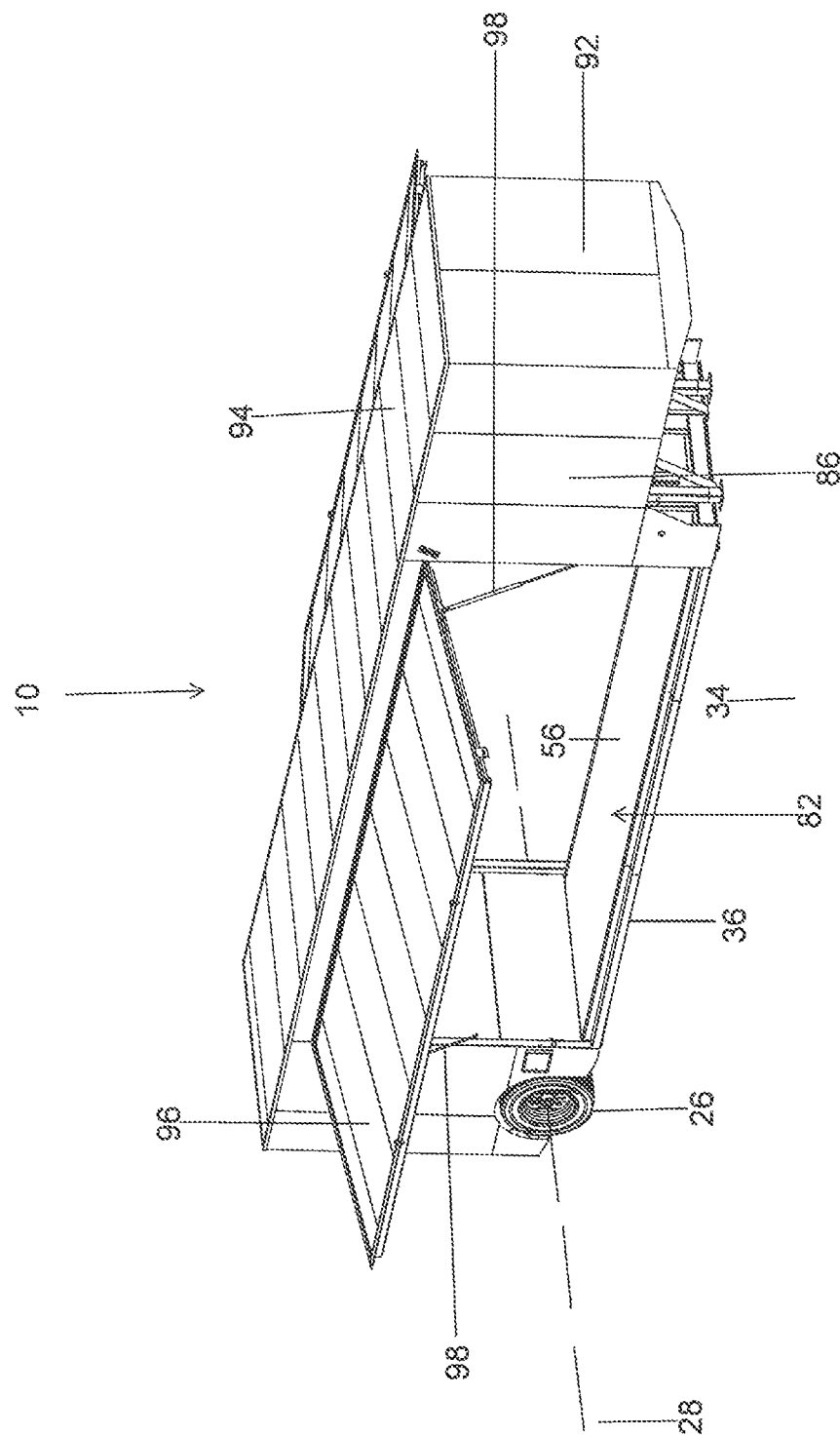
FIG. 8 is a representation of a perspective view of the semitrailer of FIG. 7 from the front of the semitrailer.

The floor frame 54 also includes a plurality of floor beams 64 that each extend laterally across the floor frame and each have laterally opposite ends connected to the first side beam 58 and the second side beam 62. A forward most of the floor beams 66 defines a forward edge of the floor and a rearward most of the floor beams 68 defines a rearward edge of the floor. The floor top surface 56 represented in February 6-13 has a rectangular configuration defined by the first longitudinal edge of the floor and the second longitudinal edge of the floor at laterally opposite sides of the floor top surface 56, and the forward edge of the floor and the rearward edge of the floor at longitudinally opposite ends of the floor top surface 56. The first side beam 58, the second side beam 62 and the plurality of floor support beams 64 all have top surfaces that are positioned in a single plane and support the flat, floor top surface 56. As represented in FIG. 6, the first side beam 58 and the second side beam 62 have bottom surfaces that are positioned in a single plane and define a bottom surface 36 of the semi trailer 10.

The vertical beams 44 secured to the kingpin assembly 18 include a first vertical forward column 72. The first vertical forward column 72 is secured to the first side beam 58, a portion of the structure of the kingpin assembly 18 and the forward most floor beam 66. The first vertical forward column 72 extends vertically upwardly and is secured to the roof frame 46. The plurality of vertical beams 44 secured to the kingpin assembly 18 also include a second vertical forward column 74. The second vertical forward column 74 is secured to the second side beam 62, a portion of the structure of the kingpin assembly 18 and the forward most floor beam 66. The second vertical forward column 74 extends vertically upwardly and is secured to the roof frame 46.

The plurality of vertical beams 42 secured to the wheel assembly 14 include a first vertical rearward column 76 that is secured to the first side beam 58, a portion of the structure of the wheel assembly 14 and the rearward most floor beam 68. The first vertical rearward column extends vertically upwardly and is secured to the roof frame 46. The plurality of vertical beams 42 secured to the wheel assembly 14 also include a second vertical rearward column 78. The second vertical rearward column is secured to the second side beam 62, a portion of the structure of the wheel assembly 14 and the rearward most floor beam 68. The second vertical rearward column extends vertically upwardly and is secured to the room frame 46.

The first vertical forward column 72 and the first vertical rearward column 76 define a first opening 82 in a first side wall of the semitrailer 10 to be described. The first opening 82 in the first side of the semitrailer 10 extends between the first vertical forward column 72 and the first vertical rearward column 76 with there being no obstructions in the first opening 82 between the first vertical forward column 72 and the first vertical rearward column 76. The first opening 82 also extends vertically between the floor top surface 56 and the roof frame 46. Thus, the first opening 82 is bordered by the floor top surface 56, the first vertical forward column 72, the roof frame 46 and the first vertical rearward column 76.

There is a second opening 84 in a second side wall of the semitrailer 10 to be described. The second opening 84 extends between the second vertical forward column 74 and the second vertical rearward column 78 with there being no obstructions in the second opening 84 between the second vertical forward column 74 and the second vertical rearward column 78. The second opening 84 also extends vertically between the floor top surface 56 and the roof frame 46. Thus, the second opening 84 is bordered by the floor top surface 56, the second vertical forward column 74, the roof frame 46 and the second vertical rearward column 78.

Although the semitrailer 10 is described herein as comprising a first opening 82 and a second opening 84, the semitrailer could be constructed with only a single opening in either side of the semitrailer.

Referring to FIGS. 1, 2 and 5-13, the semitrailer 10 is also constructed with a first side wall 86 that extends the longitudinal length of the semitrailer 10. The first side wall 86 extends between the rearward end 16 of the semitrailer and the forward end 22 of the semitrailer. The first opening 82 is in the first side wall 86 of the semitrailer 10. The first opening 82 enables an individual to access the floor top surface 56 in the interior of the semitrailer 10 through the first opening.

The semitrailer is also constructed with a second side wall 88 on a laterally opposite side of the semitrailer from the first side wall 86. The second side wall extends the longitudinal length of the semitrailer 10 between the rearward end 16 of the semitrailer and the forward end 22 of the semitrailer. The second side wall 88 is substantially a mirror image of the first side wall 86. The second opening 84 is in the second side wall 88. The second opening 84 enables an individual to access the floor top surface 56 in the interior of the semitrailer 10 through the second opening 84.

The semitrailer 10 is also constructed with a rearward wall 90 that extends laterally across the rearward end 16 of the semitrailer 10. The rearward wall 90 extends between the first side wall 86 and the second side wall 88.

The semitrailer 10 is also constructed with a forward wall 92 at the forward end 22 of the semitrailer 10. The forward wall 92 extends laterally across the forward end 22 of the semitrailer 10 between the first side wall 86 and second side wall 88.

A roof 94 extends over the top of the semi trailer 10. The roof 94 is supported on the roof frame 54. The roof 94 extends between the first side wall 86 and the second side wall 88, and between the rearward wall 90 and the forward wall 92. The roof frame 54 provides the roof 94 with sufficient strength where the roof 94 can function as an observation deck as represented in FIGS. 5-9.

The floor top surface 56 in the interior of the semitrailer 10, the first side wall 86, the second side wall 88, the rearward wall 90, the forward wall 92 and the roof 94 form an enclosure around the floor top surface 56.

A first side panel 96 is provided on the first side wall 86 of the semitrailer 10. The first side panel 96 is mounted to the first side wall 86 for movement between a closed position of the first side panel 96 relative to the first side wall 86, and an opened position of the first side panel 96 relative to the first side wall 86. In the closed position of the first side panel relative to the first side wall 86, the first side panel 96 extends over and closes the first opening 82 in the first side wall 86. This is represented in FIGS. 1, 2, 5 and 6. In the opened position of the first side panel 96 relative to the first side wall 86, the first side panel 96 projects laterally outwardly from the first side wall 86 and exposes the first opening 82 in the first side wall 86. The second position of the first side panel 96 relative to the first side wall 86 is represented in FIGS. 7-13. The first side panel 96 is connected to the first side wall 86 along a longitudinal edge of the roof frame 46. For example, the first side panel 96 could be connected to the roof frame 46 by a pivoting connection that enables the first side panel to move between its closed position relative to the first side wall 86 represented in FIGS. 1, 2, 5 and 6, to its opened position relative to the first side wall 86 represented in FIGS. 7-13. In the opened position of the first side panel 96, the first side panel 96 forms an extension of the roof 94 of the semitrailer 10. In the opened position of the first side panel 96 relative to the first side wall 86, the first side panel 96 functions as a canopy over the first opening 82 in the first side wall 86. As represented in FIGS. 7-13, a pair of actuators 98 are connected to the first side panel 96 on opposite sides of the first opening 82 in the first side wall 86. The actuators 98 could be gas activated actuators, electrically activated actuators, hydraulically activated actuators, electro-mechanically activated actuators, or any other equivalent type of actuator. The actuators 98 are selectively operated to move the first side panel 96 between its opened and closed positions relative to the first side wall 86.

A second side panel 100 could also be provided on the first side wall 86 of the semitrailer 10. The second side panel 100 is represented in FIGS. 6 and 9-13. The second side panel 100 is mounted to the first side wall 86 for movement between a closed position of the second side panel 100 relative to the first side wall 86 where the second side panel 100 extends over the first opening 82 in the first side wall 86, and an opened position of the second side panel 100 relative to the first side wall 86 where the second side panel 100 projects laterally outwardly from the first side wall 86 and exposes the first opening 82 in the first side wall 86. The second side panel 100 is connected to the first side wall 86 along the first longitudinal edge of the floor top surface 56, or along the first side beam 58 of the floor frame 54. For example, the second side panel 100 could be connected to the first side wall 86 by a pivoting connection that enables the second side panel 100 to move between its closed position relative to the first side wall 86 represented in FIGS. 1, 2, 5 and 6, to its opened position relative to the first side wall 86 represented in FIGS. 9-13. In the open position of the second side panel 100, the second side panel 100 forms an extension of the floor top surface 56 and functions as a stage or patio. Additionally, with the semitrailer 10 in its dropped down or lowered position on the surface 34, in the open position of the second side panel 100, the second side panel is substantially at the same vertical height above the surface 34 as the floor top surface 56 in the interior of the semitrailer 10. As explained earlier, the vertical height of the floor top surface 56 and the vertical height of the second side panel 100 in the open position is 11 inches or less above the surface 34, and is preferably about 8 inches above the surface 34. This enables individuals to easily access the top of the second side panel 100 in its opened position by stepping up onto the second side panel 100 from the surface 34 supporting the semitrailer 10 and the second side panel 100.

The opened positions of the first side panel 96 and the second side panel 100 relative to the first side wall 86 are represented in FIGS. 9-13. In the positions of the first side panel 96 and the second side panel 100 represented in FIGS. 9-13, the first side panel 96 is a top side panel and the second side panel 100 is a bottom side panel. The closed positions of the first side panel 96 and the second side panel 100 relative to the first side wall 86 are represented in FIGS. 1, 2, 5 and 6. In the closed positions of the first side panel 96 and the second side panel 100 represented in FIGS. 1, 2, 5 and 6, the second side panel 100 is first moved to its closed position over the first opening 82 and then the first side panel 96 is moved to its closed position over the second side panel 100 and over the first opening 82 to close the opening. These positions of the first side panel 96 and the second side panel 100 are represented in FIG. 6.

A second top side panel 102 and a second bottom side panel 104 are also provided on the second side wall 88 of the semitrailer 10. The second top side panel 102 and the second bottom side panel 104 on the second side wall 88 are substantially the same as, and operate in substantially the same manner as the top side panel 96 and the bottom side panel 98 on the first side wall 86. The second top side panel 102 and the second bottom side panel 104 on the second side wall 88 are represented in FIGS. 9-13.

The construction of the semitrailer 10 described above configures the semitrailer 10 as a mobile presentation enclosure. The floor top surface 56 in the interior of the semitrailer 10 is designed to accommodate a variety of different features, depending on what type of presentation is desired in the semitrailer 10.

Figure 9:
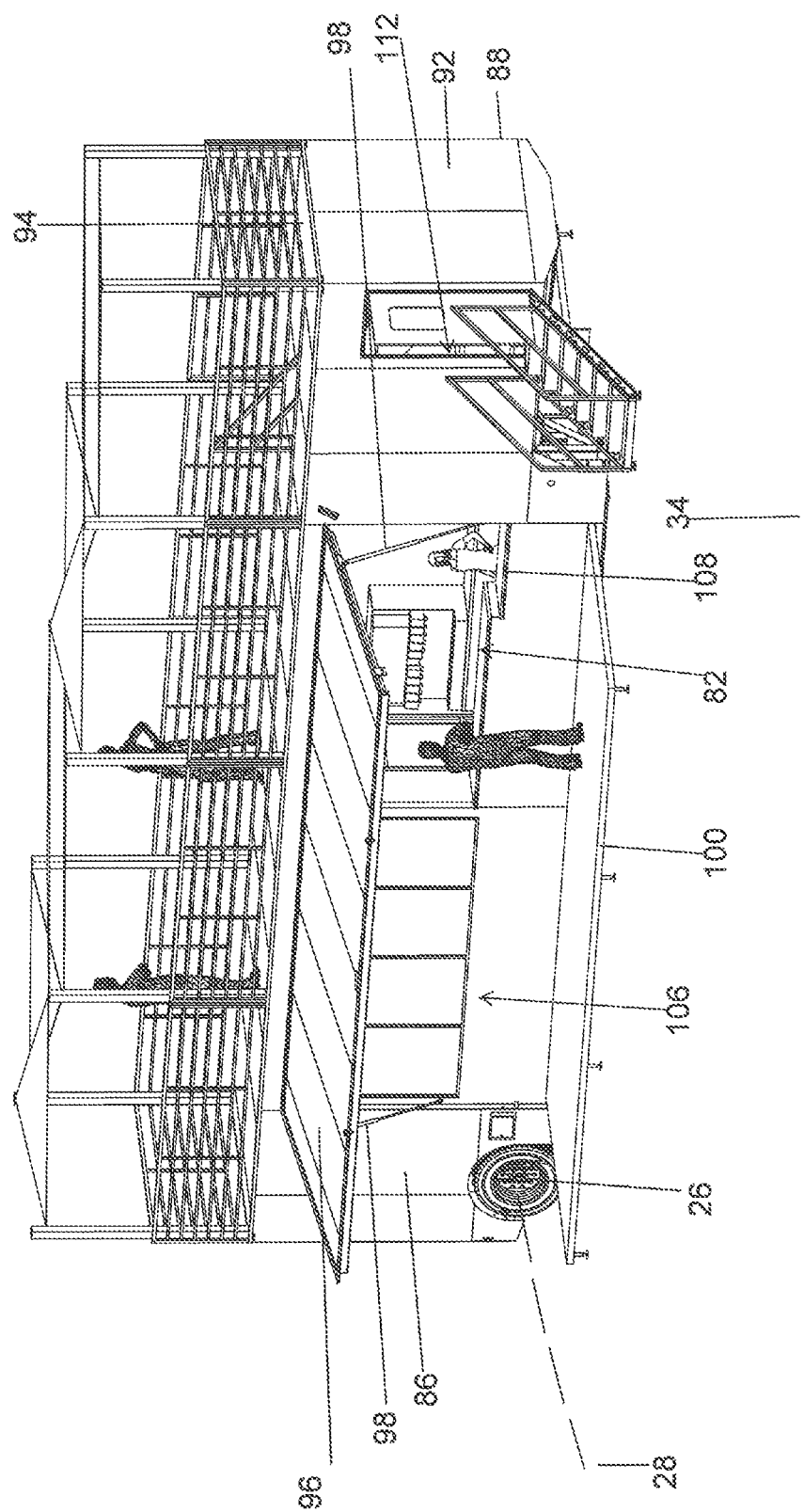
FIG. 9 is a representation of a perspective view of the semitrailer configured as a mobile presentation enclosure in the form of a kitchen from the front of the semitrailer.
Figure 10:
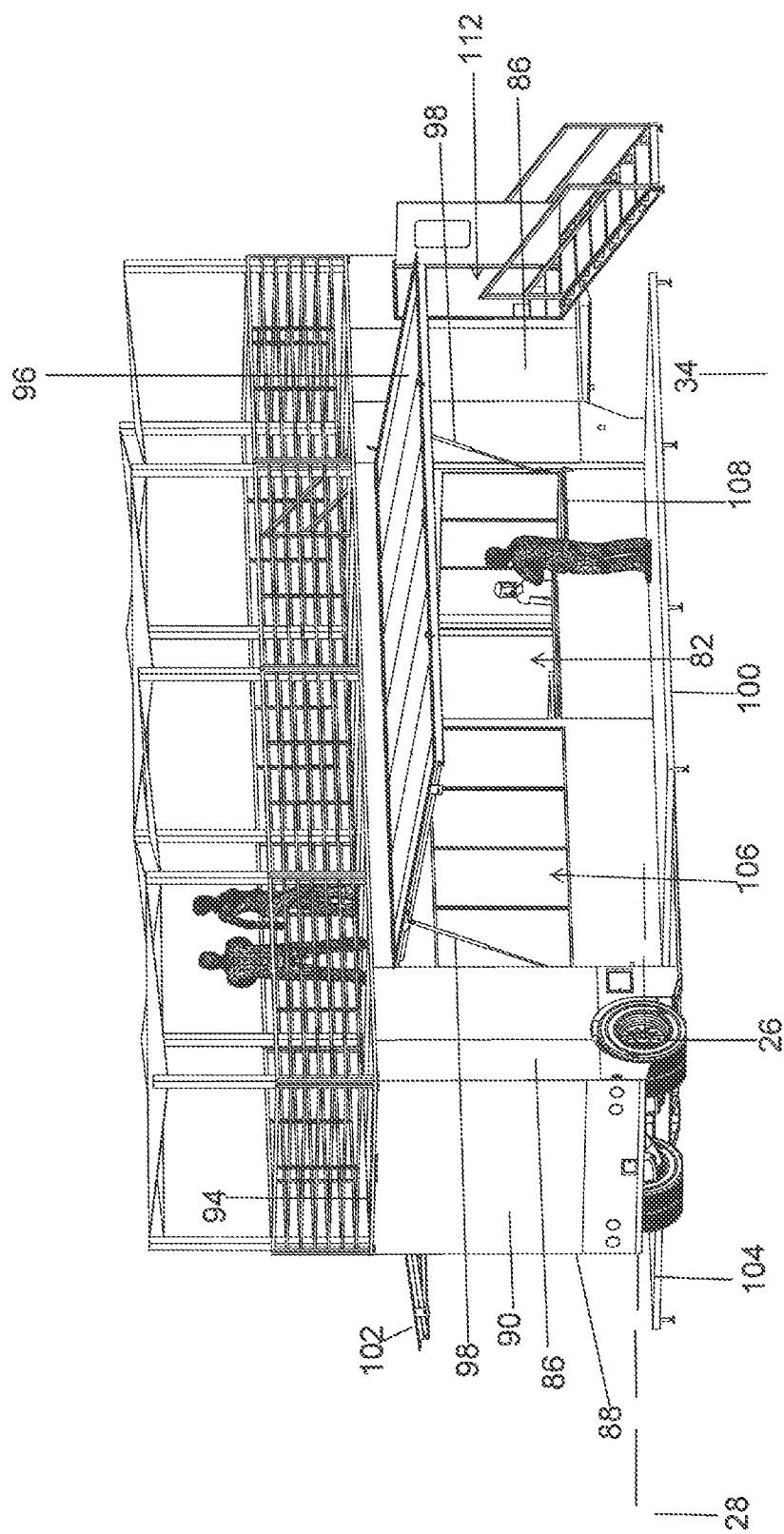
FIG. 10 is a representation of a perspective view of the semitrailer of FIG. 9 from the rear of the semitrailer.

For example, the floor top surface 56 could be outfitted with features of a food stand such as that represented in FIGS. 9 and 10. The food stand includes a kitchen 106 and an ordering counter 108 where individuals accessing the interior of the semitrailer 10 can place food orders with individuals working in the interior of the semitrailer 10. The kitchen 106 is constructed using the enclosed area 48 above the wheel assembly 14. The enclosed area 52 above the kingpin assembly 18 is constructed as a stairwell 112 that provides access to an observation deck on the roof 94.

Figure 11:
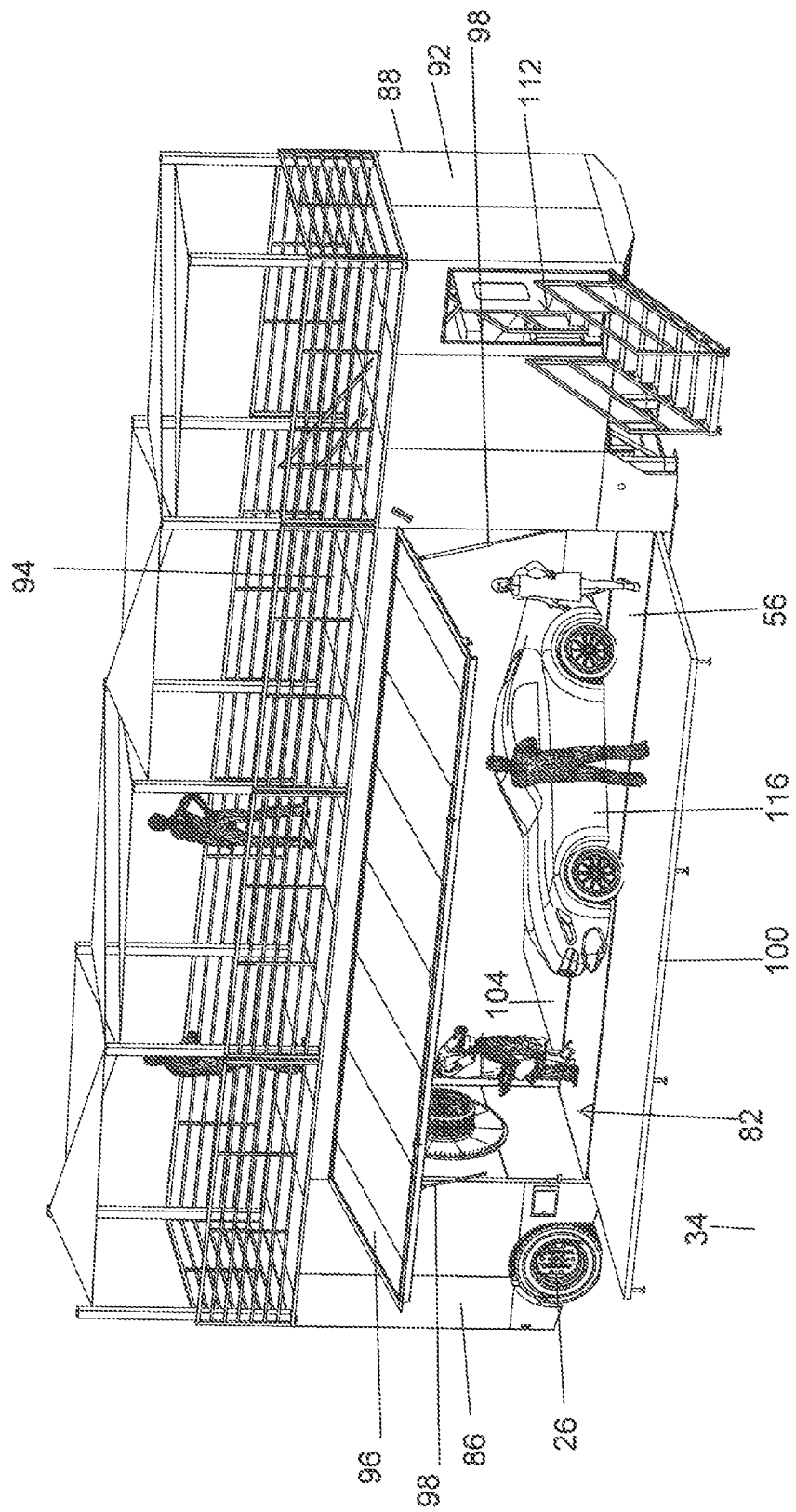
FIG. 11 is a representation of a perspective view of the semitrailer configured as a mobile presentation enclosure in the form of an automobile display from the front of the semitrailer.
Figure 12:
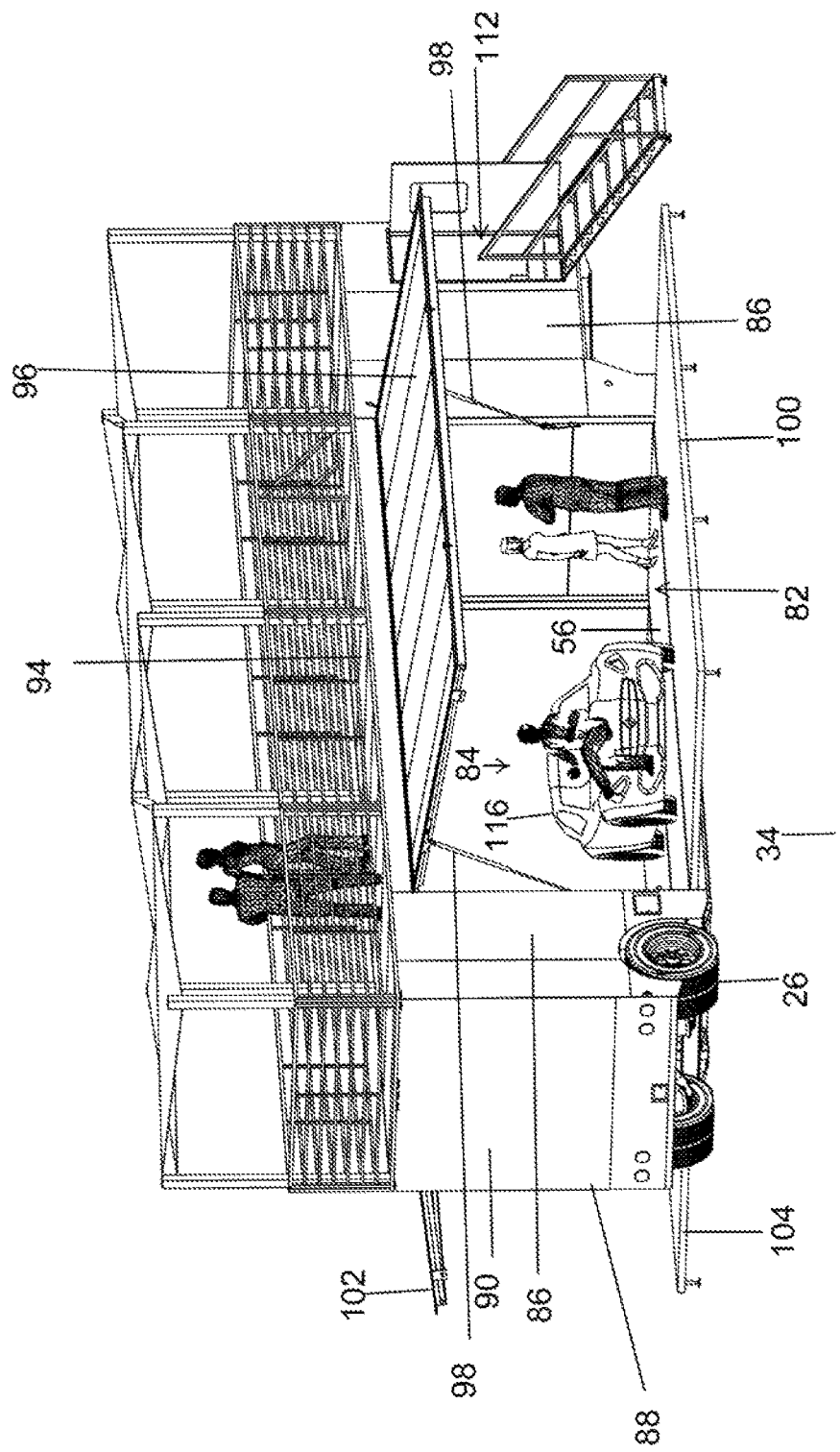
FIG. 12 is a representation of a perspective view of the semitrailer of FIG. 11 from the rear of the semitrailer.

The floor top surface 56 in the interior of the semitrailer 10 could be outfitted with features of an automobile display such as that represented in FIGS. 11 and 12. The automobile display could include an automobile 116 supported on the floor top surface 56. Individuals can access the floor top surface 56 in the interior of the semitrailer 10 to observe the automobile 116.

Figure 13:
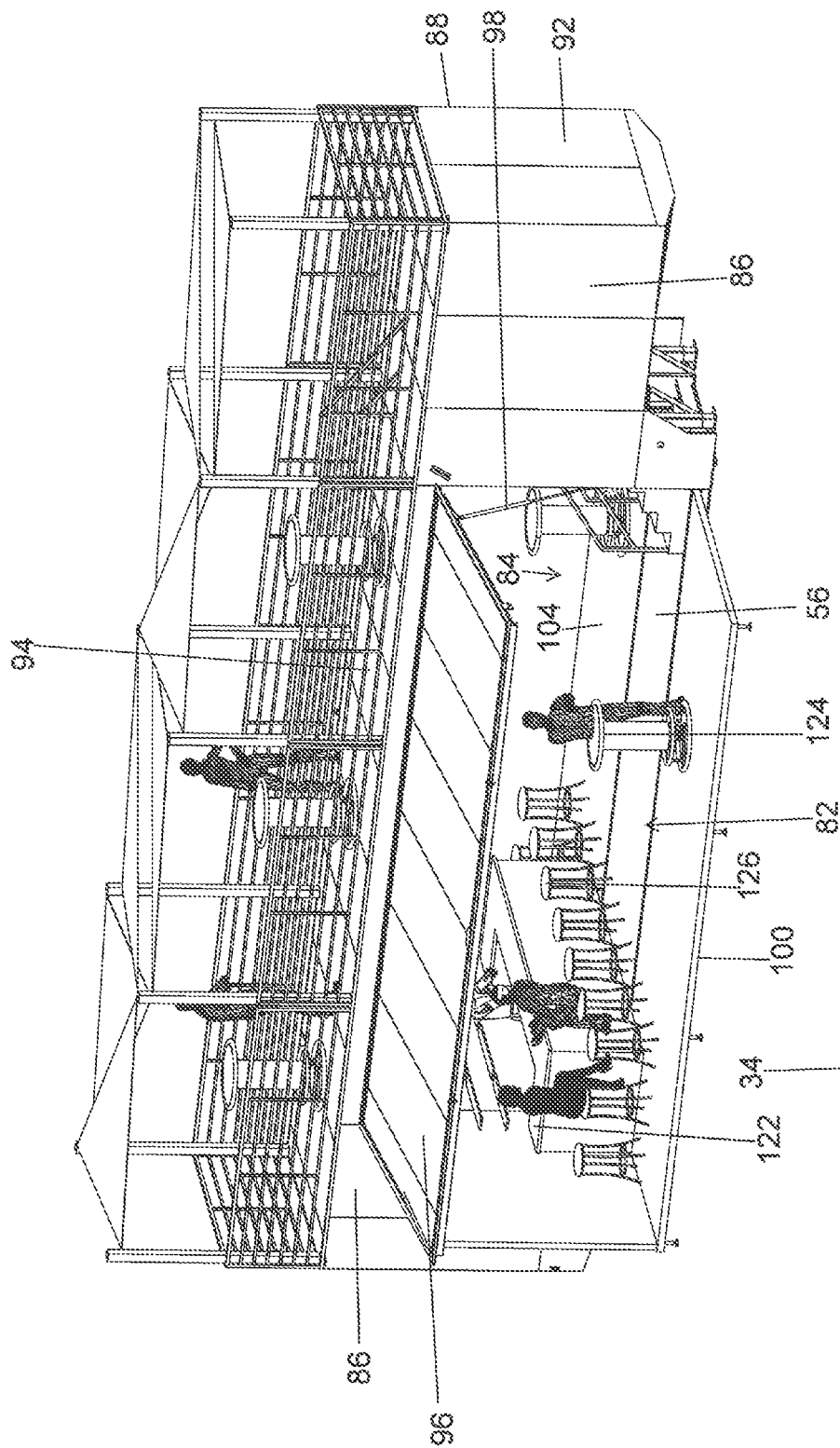
FIG. 13 is a representation of the semitrailer configured as a mobile presentation enclosure in the form of a lounge from the front of the semitrailer.

The floor top surface 56 in the interior of the semitrailer 10 could also be outfitted with features of a lounge such as that represented in FIG. 13. The lounge could include a bar 122, tables 124 and chairs 126. Individuals accessing the interior of the semitrailer 10 could place orders for beverages at the bar 122, and then relax at the tables 124 and chairs 126.

The above are only a few examples of how the semitrailer 10 can be configured as a mobile presentation enclosure, where the top surface 56 of the floor in the semitrailer is positioned below the axis of rotation 28 of the semitrailer wheels 26 when the semitrailer is detached from a truck 12, enabling individuals to easily access the floor top surface 56 in the interior of the semitrailer 10 by taking one step up onto the floor top surface 56. It should be understood that the semitrailer could also be configured for many other uses such as providing food service, providing inspection processes, providing fabrication support, providing retail services, etc.

As various modifications could be made to the semitrailer herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A semitrailer configured as a mobile presentation enclosure, the semitrailer comprising:
a side panel on a side of the semitrailer, the side panel being moveable between a closed position where the side panel extends over the side of the semitrailer and an opened position where the side panel projects outwardly from the side of the semitrailer and exposes an opening in the side of the semitrailer that provides an individual access to an interior of the semitrailer through the opening;
a floor in the interior of the semitrailer, the floor having a top surface that has a configuration defined by a first longitudinal edge of the floor and a second longitudinal edge of the floor at laterally opposite sides of the floor, and a forward edge of the floor and a rearward edge of the floor at longitudinally opposite ends of the floor;
a kingpin assembly secured to the forward edge of the floor, the kingpin assembly including a kingpin that is positioned vertically above the floor by the kingpin assembly, the kingpin being releasably attachable to a truck;
a wheel assembly secured to the rearward edge of the floor, the wheel assembly including wheels having an axis of rotation, the axis of rotation being positioned vertically above the floor by the wheel assembly; and,
the kingpin assembly and the wheel assembly being configured whereby, when the wheels are on a surface and the kingpin is releasably attached to a truck on the surface, the wheels and the truck support the semitrailer spaced vertically above the surface with the top surface of the floor oriented at an angle relative to the surface, and when the wheels are on the surface and the kingpin is not attached to a truck, the semitrailer drops down onto and is supported on the surface with the top surface of the floor substantially parallel to the surface.

2. The semitrailer of claim 1, further comprising:
the side panel being a bottom side panel that is supported on the surface when the bottom side panel is moved to the opened position, the bottom side panel in the opened position being an extension of the top surface of the floor.

3. The semitrailer of claim 1, further comprising:
a second side panel on the side of the semitrailer, the second side panel being a top side panel that is moveable between a closed position where the top side panel extends over the side of the semitrailer and an opened position where the side panel projects outwardly from the side of the semitrailer and over the opening and over the bottom side panel in the opened position.

4. The semitrailer of claim 1, further comprising:
the side panel on the side of the semitrailer being a first side panel on a first side of the semitrailer;
the semitrailer having a second side on an opposite side of the semitrailer from the first side;
a second side panel on the second side of the semitrailer, the second side panel being moveable between a closed position where the second side panel extends over the second side of the semitrailer and an open position where the second side panel projects outwardly from the second side of the semitrailer and exposes a second opening in the second side of the semitrailer that provides an individual access to the interior of the semitrailer through the second opening.

5. The semitrailer of claim 4, further comprising:
the second side panel being a second bottom side panel that is supported on the surface when the second bottom side panel is moved to the opened position, the second bottom side panel in the opened position being an extension of the top surface of the floor.

6. The semitrailer of claim 1, further comprising:
a roof on the semitrailer, the roof being supported by the kingpin assembly and the wheel assembly spaced vertically above the floor, the roof extending between the kingpin assembly and the wheel assembly whereby the floor, the kingpin assembly, the wheel assembly and the roof border and define the opening in the side of the semitrailer.

7. The semitrailer of claim 6, further comprising:
an observation deck on the roof, the observation deck being configured for individual access on the observation deck.

8. The semitrailer of claim 1, further comprising:
a frame of the semitrailer, the frame including a first side beam that extends longitudinally beneath the floor along the first longitudinal edge of the floor and a second side beam that extends longitudinally beneath the floor along the second longitudinal edge of the floor;
a first vertical forward column secured to the first side beam and the kingpin assembly at the forward edge of the floor;
a first vertical rearward column secured to the first side beam and the wheel assembly at the rearward edge of the floor; and,
the opening in the side of the semitrailer extending between the first vertical forward column and the first vertical rearward column with there being no obstructions in the opening between the first vertical forward column and the first vertical rearward column.

9. The semitrailer of claim 8, further comprising:
a second vertical forward column secured to the second side beam and the kingpin assembly at the forward edge of the floor;
a second vertical rearward column secured to the second side beam and the wheel assembly at the rearward edge of the floor; and,
a second opening in a second side of the semitrailer extending between the second vertical forward column and the second vertical rearward column with there being no obstructions in the second opening between the second vertical forward column and the second vertical rearward column.

10. A semitrailer configured as a mobile presentation enclosure, the semitrailer comprising:
a first side wall that extends a longitudinal length of the semitrailer between a rearward end of the semitrailer and a forward end of the semitrailer;
a second side wall that extends the longitudinal length of the semitrailer between the rearward end of the semitrailer and the forward end of the semitrailer, the second side wall being spaced laterally from the first side wall;
a rearward wall that extends laterally across the rearward end of the semitrailer between the first side wall and the second side wall;
a forward wall that extends laterally across the forward end of the semitrailer between the first side all and the second side wall;
a roof that extends over the semitrailer between the first side wall and the second side wall and the rearward wall and the forward wall;
a floor in the interior of the semitrailer, the first side wall, second side wall, rearward wall, forward wall and roof forming an enclosure around the floor;
an opening in the first side wall of the semitrailer, the opening enabling an individual to access an interior of the semitrailer through the opening;
a first side panel on the first side wall of the semitrailer, the first side panel being moveable between a closed position where the first side panel extends over the opening in the first side wall of the semitrailer and an opened position where the first side panel projects outwardly from the first side wall of the semitrailer and exposes the opening in the first side wall of the semitrailer;
a kingpin assembly at the forward end of the semitrailer;
a wheel assembly at the rearward end of the semitrailer; and,
the kingpin assembly and the wheel assembly being configured whereby when the wheel assembly is on a surface and the kingpin assembly is unattached to a truck, a bottom of the semitrailer engages on and is supported on the surface.

11. The semitrailer of claim 10, further comprising:
the first side panel being a first bottom side panel that is supported on the surface when the first bottom side panel is moved to the opened position, the first bottom side panel in the opened position being an extension of the floor.

12. The semitrailer of claim 11, further comprising:
a second side panel on the first side wall of the semitrailer, the second side panel being a top side panel that is moveable between a closed position where the top side panel extends over the first side wall of the semitrailer and an opened position where the second side panel projects outwardly from the roof and the first side wall of the semitrailer and over the opening and the first bottom side panel in the opened position of the first bottom side panel.

13. The semitrailer of claim 10, further comprising:
a second side panel on the second side wall of the semitrailer, the second side panel being moveable between a closed position where the second side panel extends over the second side wall of the semitrailer and an opened position where the second side panel projects outwardly from the second side wall of the semitrailer and exposes a second opening in the second side wall of the semitrailer that provides an individual access to the interior of the semitrailer through the second opening.

14. The semitrailer of claim 13, further comprising:
the second side panel being a second bottom side panel that is supported on the surface when the second bottom side panel is moved to the opened position, the second bottom side panel in the opened position being an extension of the floor.

15. The semitrailer of claim 10, further comprising:
the roof being supported by the kingpin assembly and the wheel assembly spaced vertically above the floor, the roof extending between the kingpin assembly and the wheel assembly whereby the floor, the kingpin assembly, the wheel assembly and the roof border and define the opening in the side of the semitrailer.

16. The semitrailer of claim 15, further comprising:
an observation deck on the roof, the observation deck being configured for individual access on the observation deck.

17. The semitrailer of claim 10, further comprising:
a frame of the semitrailer, the frame including a first side beam that extends longitudinally beneath the floor along a first longitudinal edge of the floor and a second side beam that extends longitudinally beneath the floor along a second longitudinal edge of the floor that is laterally opposite the first longitudinal edge of the floor;
a first vertical forward column secured to the first side beam and the kingpin assembly at a forward edge of the floor;
a first vertical rearward column secured to the first side beam and the wheel assembly at a rearward edge of the floor; and,
the opening in the first side wall of the semitrailer extending between the first vertical forward column and the first vertical rearward column with there being no obstructions in the opening between the first vertical forward column and the first vertical rearward column.

18. The semitrailer of claim 17, further comprising:
a second vertical forward column secured to the second side beam and the kingpin assembly at the forward edge of the floor;
a second vertical rearward column secured to the second side beam and the wheel assembly at the rearward edge of the floor; and,
a second opening in the second side wall of the semitrailer extending between the second vertical forward column and the second vertical rearward column with there being no obstructions in the second opening between the second vertical forward column and the second vertical rearward column.

19. A method of configuring a semitrailer as a mobile presentation enclosure, the method comprising:
providing an opening in a side wall of the semitrailer;
providing a side panel on the side wall of the semitrailer, the side panel being moveable between opened and closed positions relative to the side wall of the semitrailer;
moving the side panel to the closed position of the side panel relative to the side wall of the semitrailer where the side panel covers over the opening in the side wall of the semitrailer;
providing a wheel assembly on a rearward end of the semitrailer where, when a forward end of the semitrailer is not attached to a truck, the wheel assembly supporting the trailer on a surface enables the trailer to be dropped down with a bottom of the semitrailer engaging on the surface; and,
moving the side panel to the opened position of the side panel relative to the side wall of the semitrailer where the side panel projects outwardly from the side wall of the semitrailer and forms an extension of a floor in an interior of the semitrailer.

20. The method of claim 19, further comprising:
positioning the side panel on the side wall of the semitrailer where, when the semitrailer is not attached to a truck and is supported on the surface, moving the side panel to the opened position of the side panel relative to the side wall causes the side panel to extend outwardly from the floor in the interior of the trailer and be supported on the surface.

* * * * *